March 11, 1941.   S. W. CRAIG   2,234,798
MUD LINE PRESSURE CONTROL VALVE
Filed Jan. 29, 1940   3 Sheets-Sheet 2

S. W. Craig
L. B. James

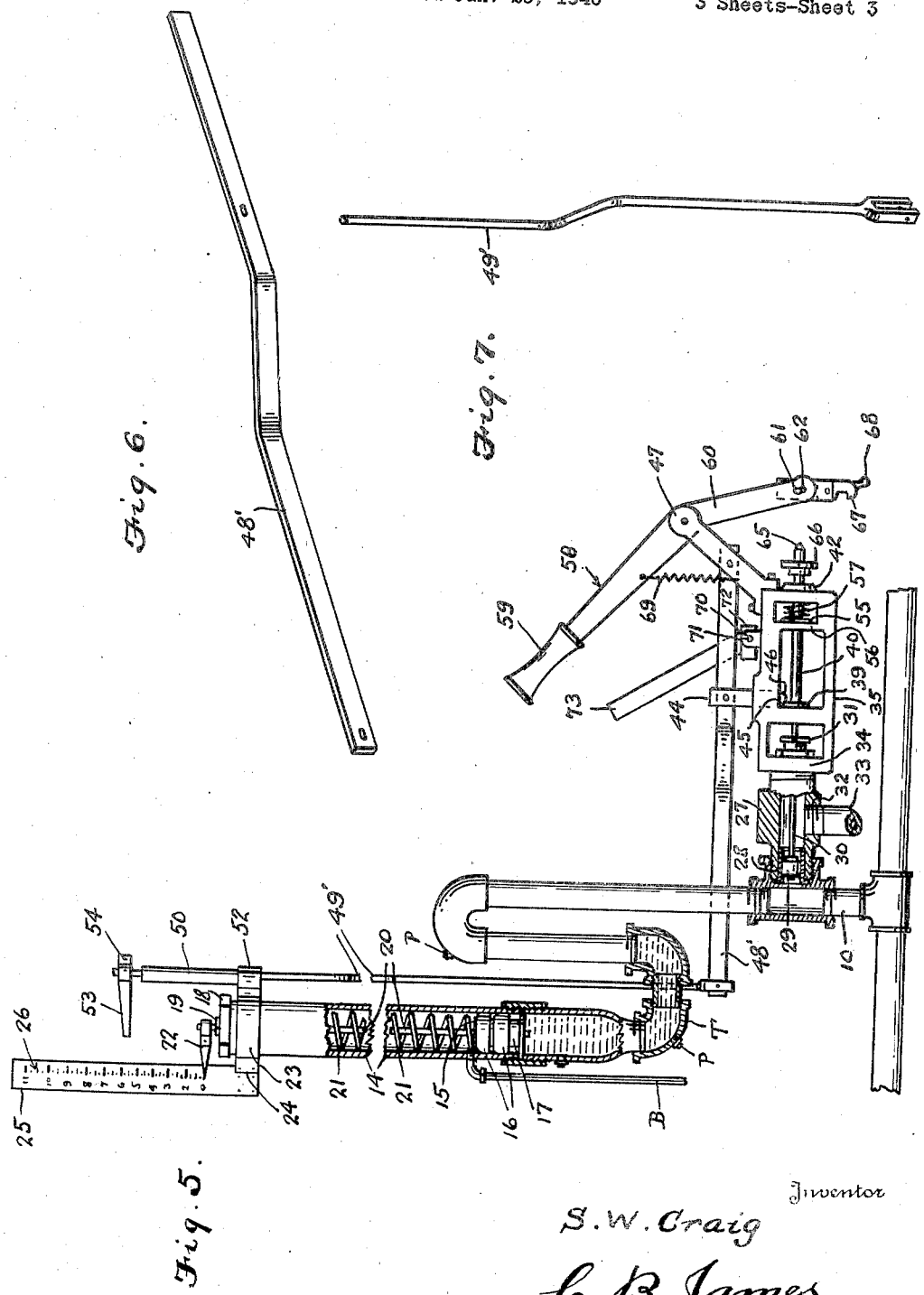

Patented Mar. 11, 1941

2,234,798

UNITED STATES PATENT OFFICE 2,234,798

MUD LINE PRESSURE CONTROL VALVE

Samuel W. Craig, Stafford, Kans.

Application January 29, 1940, Serial No. 316,251

4 Claims. (Cl. 137—53)

This invention relates to rotary drilling rigs and has special reference to a mud line pressure control valve for such rigs.

In rigs of this character the mud line has a working pressure of a definite amount, generally between 300 and 1400 pounds per square inch, depending on the depth and other conditions existing during drilling. Where the pressure becomes too high, due to one cause or another, some part of the equipment will break, such breakage usually occurring in the rubber hose carrying water under pressure to the bottom of the well.

One important object of the invention is to provide a novel gauge arrangement whereby the well driller can visually observe the pressure in the mud line.

A second important object of the invention is to provide a novel by-pass arrangement adjustable for operation under a predetermined pressure whereby, upon such pressure being exceeded, the by-pass will open and thus pressure on the mud line and water line will be relieved so that breakage of the equipment due to excess pressure is avoided.

A third important object of the invention is to provide a novel arrangement of control for the by-pass whereby the by-pass control is latched against operation until the pressure in the mud line exceeds that desired, the latching arrangement being also manually releasable.

A fourth important object of the invention is to provide a novel device of this character wherein means exist for holding the by-pass open when such opening is desired.

With the above and other objects in view, the invention consists in general of certain novel details of construction and combinations of parts hereinafter fully described, illustrated in the accompanying drawings and particularly pointed out in the appended claims.

In the accompanying drawings like characters of reference indicate like parts in the several views, and—

Figure 5 is a side view partly in section of a modified form of the mud-line pressure control regulator.

Figure 6 is a detail perspective view of the trip lever employed in the modified form of the mud-line pressure control regulator.

Figure 7 is a similar view of the trip rod thereof.

Figure 1:
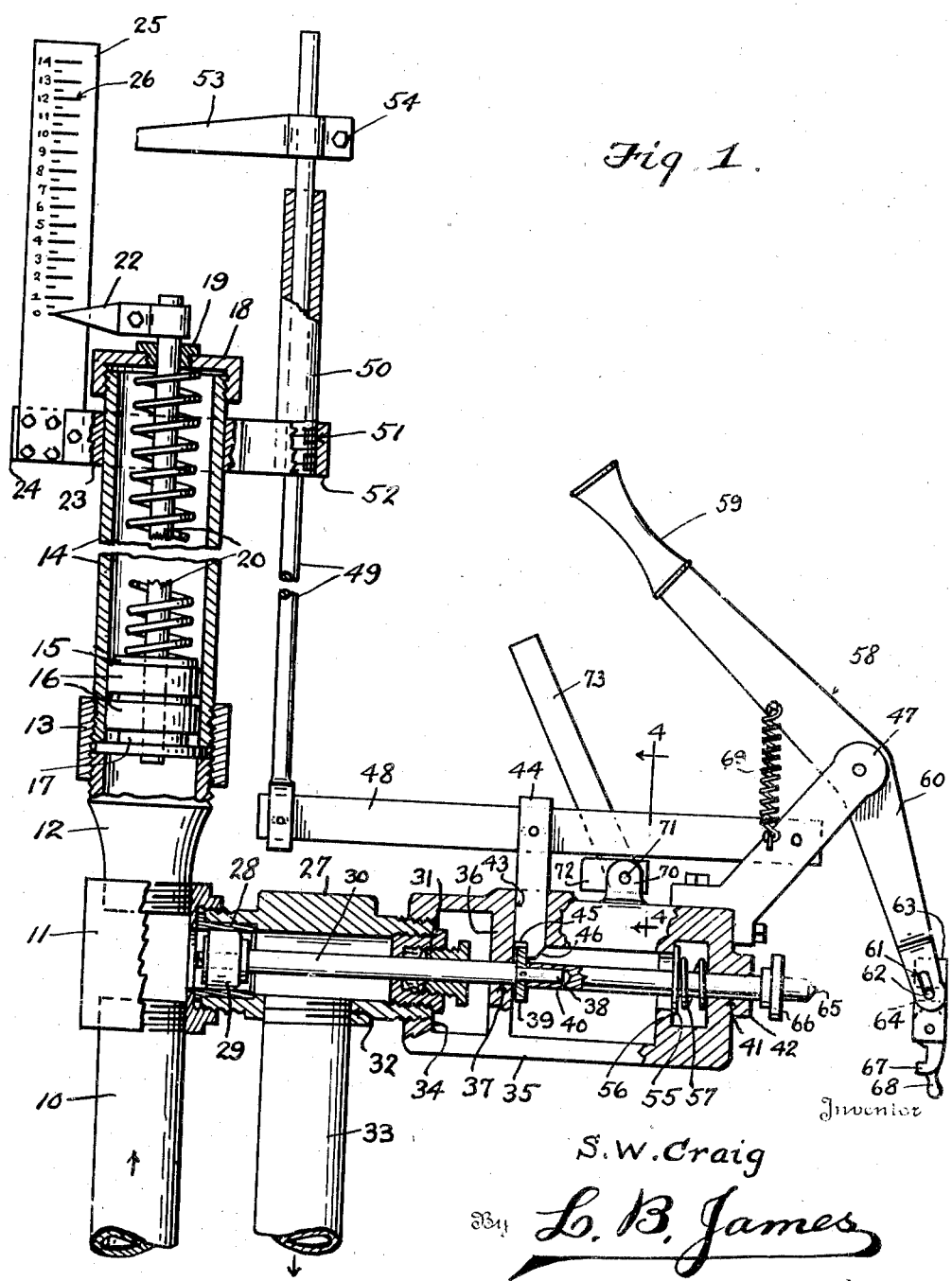
Figure 1 is a side elevation, partly in section of the complete by-pass control.
Figure 2:
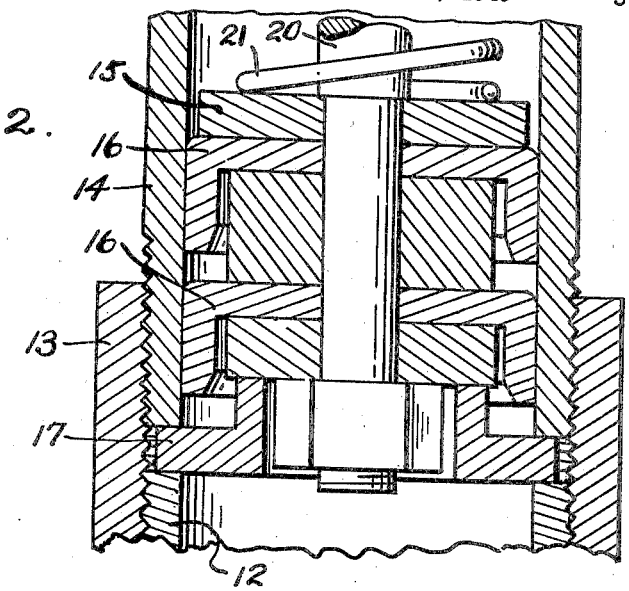
Figure 2 is an enlarged vertical sectional view of the cylinder and piston.
Figures 3, 4:
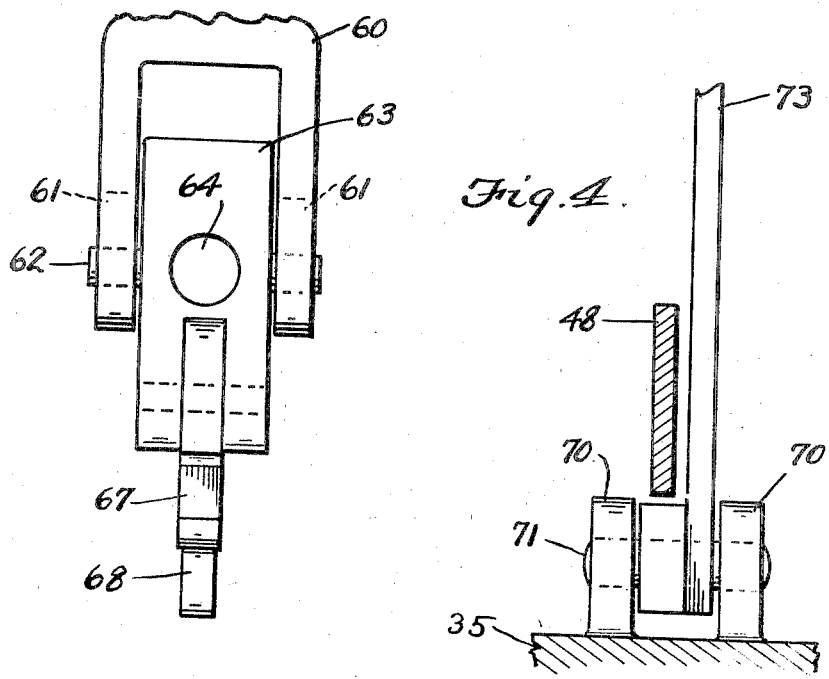
Figure 3 is front view of the hook lock.
Figure 4 is an enlarged sectional view approximately on line 4—4 of Figure 1.

As herein shown the mud line which conveys mud and water from the bottom of the drill hole, is provided with an upper end or extension 10 whereon is screwed a tee 11 having top and side outlets. Into the top outlet is screwed a nipple 12 having an enlarged upper end which is screwed into a collar 13. Into the upper end of the collar 13 is screwed the lower end of a cylinder 14. In this cylinder moves a piston 15 provided with downwardly facing cup packings 16. Mounted between the upper end of the nipple 12 and the lower end of the cylinder 14 is a valve seat 17 on which the lower end of the piston 15 seats to close the passage between the nipple and cylinder. A cap or head 18 is screwed on the upper end of the cylinder 14 and is provided centrally with a guide bushing 19 wherethrough passes a piston rod 20 having the piston 15 secured to its lower end. A compression spring 21 surrounds the rod 20 and bears at its ends against the piston 15 and cap 18 to urge the piston to seat on the seat 17. The upper end of the rod 20 projects above the bushing 19 and carries a pointer or index 22. A collar 23 surrounds and is fixed on the cylinder 14 slightly below the cap 18. An arm 24 projects radially from the collar 23 and carries a scale member 25 provided with a scale 26 here shown as graduated in hundreds of pounds and halves thereof. The pointer 22 traverses this scale.

Screwed into the side outlet of the tee 11 is a valve cylinder 27 which is provided at the screwed in end with a cylindrical valve seat 28 wherein normally rests a valve 29 provided with a stem 30 which passes through a stuffing box 31 screwed into the outer end of the valve cylinder 27. In the lower part of the valve cylinder 27 is formed an opening 32 wherein is screwed the upper end of a waste pipe 33. Screwed onto the outer end of the valve cylinder 27 is the cylindrical end 34 of a frame 35. This frame includes a cross bar 36 having a suitable opening 37 to permit passage of the valve stem 30. A reduced end 38 is formed on the stem 30 to provide a shoulder at the junction of the end 38 and the body of the stem. A collar 39 is pinned on the end 38 to rest against said shoulder and a stem extension 40 is also pinned on the end 38 and passes through a guide opening 41 formed in the end portion 42 of the frame. A vertical slot 43 is provided in the upper part of the frame and through this slot moves a latch bar 44 rabbeted as at 45 and bevelled as at 46, the collar 39 normally being engaged in the rabbet 45 so that opening movement of the piston valve 29 is prevented.

Mounted on the outer end of the frame 35 is an upwardly and outwardly extending bracket 47 whereto is pivoted one end of a trip lever 48 having the upper end portion of the sliding latch 44 pivoted thereto about centrally thereof. The remaining or inner end of the lever 48 has pivoted thereto a trip rod 49 which extends upwardly through a guide sleeve 50. This sleeve 50 has its lower end screwed into an opening 51 formed in an arm 52 projecting from the collar 23. Slidable mounted on the upper end of the rod 49 is a trip arm 53 which has the portion fitting the rod in the form of a clamp, a bolt 54 being provided to tighten this clamp and thus secure to arm 53 in adjusted position on the rod. A plate 55 is mounted on the stem extension 40 and normally rests against frame portions 56, being yieldingly there held by a compression spring 57.

Mounted on the upper end of the bracket 47 is a lever 58 having an upper handle arm 59 and a lower forked arm 60. The arm 60 is slotted as at 61 to receive a pin 62 on which is mounted a push member 63 having a conical socket 64 facing the frame 35. The end of the extension 40 projects through the frame portion 42 and has a conical extremity 65. Also, a collar 66 is pinned on the projecting end of the member 40. Pivoted to the lower end of the member 63 is a hook latch 67 engageable with the collar in certain positions of the apparatus. A thumb piece 68 is provided for manipulating the latch 67. A coiled tension spring 69 has one end attached to the upper arm 59 and its other end attached to the bracket 47 so as to normally hold the arm 60 away from the frame 35.

Mounted on the upper part of the frame 35 is an ear 70 wherein is journalled a rock shaft 71 having mounted thereon a rocker 72 which lies beneath the lever 48. A lever 73 is fixed on the shaft 71 to rock the same manually.

In the operation of the device the trip arm 53 is set opposite the scale division indicating the number of pounds per square inch (as shown in Figure 1, 950 pounds per square inch) constituting the upper limit of pressure to be allowed in the mud line. When the pressure rises in the mud line, upon water being forced down into the well, the piston 15 will rise and carry the pointer 22 upward until the upper end of the rod 20 engages the trip arm. Any increase of pressure will lift the trip arm and trip rod 49 which will tilt the lever 48 upwardly on the pivotal connection to the bracket 47. This will lift the sliding latch 44 until it is disengaged from the collar 39. The piston 29 is now free to move and, due to the pressure in the tee 11, it will be forced outwardly to open a passage from the mud line 10 to the outlet pipe 33. The collar 39 will move outwardly until it engages the plate 55, the spring 57 taking up the shock due to this sudden movement. When it is desired to restore the valve 29 to its normal position the lever 58 is operated to move the arm 60 towards the frame 35. As this is done the rod end 65 is engaged in the socket 64 and the extension 40, stem 30 and piston valve 29 moved inwardly. Also, the piston may be held outwardly by swinging the hook 67 up to engage the collar 66. If it is desired to manually release the latch 44 the lever 73 is manually swung outwardly which causes the rocker 72 to tilt and raise the lever 48 and consequently raise the latch 44. If there is pressure in the line 10, the valve 29 will open but if it is desired to open the valve 29 when there is no pressure in the line 10, the lever 58 is swung to permit the engagement of hook 67 with the collar 66 and then the spring 69 will restore the lever 58 to its normal position and thus the valve 29 will be pulled to open position.

In the modified form of the mud line pressure control valve as shown in Figure 5 a suitable oil trap T is connected between the tee 11, or other convenient point ahead of the valve 29, and the cylinder 14 and is provided with drain plugs P, said cylinder is also provided with a by-pass B ahead of the piston 16.

In the modified form of the invention a trip lever 48' and trip rod 49' are substituted for trip lever 48 and trip rod 49 the same being bent as shown to dispose the same in operative connection by the trap T, however, the same may be of any other configuration capable of performing the same functions.

Through the instrumentality of the aforesaid mechanism the cylinder 14, piston 16 and spring 21 can be made small and wear on the same will be reduced to the minimum.

What is claimed is:

1. In a mud line pressure control, a cylinder having an inlet adapted for connection to the upper end of a mud line, a piston in said cylinder, a piston rod carried by said piston and extending through the end of said cylinder remote from the inlet, a lateral escape communicating with the end of the cylinder adjacent the inlet, a valve controlling the flow of material through said escape structure, a latch member normally holding said valve closed, and means to release said latch member whereby the valve opens under pressure from the inlet, said last means including a tiltable lever connected to said latch member, a trip rod extending substantially at right angles to the free end of said lever, a trip arm extending from said trip rod into the path of the piston rod and adjustable along the trip rod, and means to secure the trip arm in adjusted position.

2. In a mud line pressure control, a cylinder having an inlet adapted for connection to the upper end of a mud line, a piston in said cylinder, a piston rod carried by said piston and extending through the end of said cylinder remote from the inlet, a lateral escape communicating with the end of the cylinder adjacent the inlet, a valve controlling the flow of material through said escape structure, a latch member normally holding said valve closed, and means operated by said piston rod to release said latch member whereby the valve opens under pressure from the inlet, said last means including a trip lever connected to said latch member, a rocker beneath said lever to tilt the same, and manually operable means to actuate the rocker.

3. In a mud line pressure control, a cylinder having an inlet adapted for connection to the upper end of a mud line, a piston in said cylinder, a piston rod carried by said piston and extending through the end of said cylinder remote from the inlet, a lateral escape communicating with the end of the cylinder adjacent the inlet, a valve controlling the flow of material through said escape structure, a latch member normally holding said valve closed, means to release said latch member whereby the valve opens under pressure from the inlet, said last means including a tiltable lever connected to said latch member, a trip rod extending substantially at right angles to the free end of said lever, a trip arm extending from said trip rod into the path of the piston rod and adjustable along the trip rod, means to secure the trip arm in adjusted position, a valve stem extending from said valve, and a manually operable lever engageable with the valve stem and movable to restore the valve to normal position.

4. In a mud line pressure control, a cylinder having an inlet adapted for connection to the upper end of a mud line, a piston in said cylinder, a piston rod carried by said piston and extending through the end of said cylinder remote from the inlet, a lateral escape communicating with the end of the cylinder adjacent the inlet, a valve controlling the flow of material through said escape structure, a latch member normally holding said valve closed, means operated by said piston rod to release said latch member whereby the valve opens under pressure from the inlet, said last means including a trip lever connected to said latch member, a rocker beneath said lever to tilt the same, manually operable means to actuate the rocker, a valve stem extending from said valve, and a manually operable lever engageable with the valve stem and movable to restore the valve to normal position.

SAMUEL W. CRAIG.